(12) United States Patent
Imaizumi (10) Patent No.: US 12,389,115 B2
(45) Date of Patent: Aug. 12, 2025

(54) IMAGE PICKUP APPARATUS CAPABLE OF, WHEN MANUAL FOCUS OPERATION IS PERFORMED DURING PHOTOGRAPHING, PERFORMING PHOTOGRAPHING WITH SUBJECT DESIRED BY USER IN FOCUS WHILE MAINTAINING ENTIRE VIDEO IMAGE IN COMPOSITION INTENDED BY USER, CONTROL METHOD FOR IMAGE PICKUP APPARATUS, AND STORAGE MEDIUM

(71) Applicant: CANON KABUSHIKI KAISHA, Tokyo (JP)

(72) Inventor: Tsubasa Imaizumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 18/515,569

(22) Filed: Nov. 21, 2023

(65) Prior Publication Data
US 2024/0187731 A1    Jun. 6, 2024

(30) Foreign Application Priority Data
Dec. 2, 2022    (JP) ................................ 2022-193493

(51) Int. Cl.
*H04N 23/67*      (2023.01)
*G02B 7/10*       (2021.01)
*H04N 5/262*      (2006.01)

(52) U.S. Cl.
CPC ............. *H04N 23/67* (2023.01); *G02B 7/10* (2013.01); *H04N 5/2621* (2013.01)

(58) Field of Classification Search
CPC .... H04N 23/67; H04N 5/2621; H04N 23/633; H04N 23/635; H04N 23/673; H04N 23/675; G02B 7/10
See application file for complete search history.

(56) References Cited

U.S. PATENT DOCUMENTS 11,889,179 B2 *   1/2024   Mine ................... G06F 3/04847
2004/0165879 A1 * 8/2004   Sasaki ..................... G02B 7/28
                                                         396/137

(Continued)

FOREIGN PATENT DOCUMENTS

JP      2004-287180 A    10/2004

*Primary Examiner* — Shahbaz Nazrul
(74) *Attorney, Agent, or Firm* — Cowan, Liebowitz & Latman, P.C.

(57) ABSTRACT

An image pickup apparatus capable of, when a manual focus operation is performed during photographing, performing photographing with a subject desired by a user in focus is provided. The image pickup apparatus includes a display unit to display a video image being photographed on a screen, a rendering unit to render information on a focus of an image pickup lens on the screen, a first obtaining unit to obtain a current focus position, a second obtaining unit to obtain a moving direction of the current focus position, a registration unit to register a focus position, a first highlighting unit to, in a case that a first condition is satisfied, render first information and perform a first highlighted display of the screen, and a second highlighting unit to, in a case that a second condition is satisfied, render second information and perform a second highlighted display of the screen.

16 Claims, 5 Drawing Sheets

(56) References Cited

U.S. PATENT DOCUMENTS

| | | | | |
|---|---|---|---|---|
| 2013/0022343 A1* | 1/2013 | Ozeki | ............... | H04N 23/69 |
| | | | | 396/82 |
| 2014/0085233 A1* | 3/2014 | Sudo | ............... | G06F 3/041 |
| | | | | 345/173 |
| 2015/0124143 A1* | 5/2015 | Ichihara | ............... | H04N 23/633 |
| | | | | 348/333.03 |
| 2017/0064192 A1* | 3/2017 | Mori | ............... | H04N 23/632 |
| 2019/0014268 A1* | 1/2019 | Homma | ............... | H04N 23/633 |

* cited by examiner

IMAGE PICKUP APPARATUS CAPABLE OF, WHEN MANUAL FOCUS OPERATION IS PERFORMED DURING PHOTOGRAPHING, PERFORMING PHOTOGRAPHING WITH SUBJECT DESIRED BY USER IN FOCUS WHILE MAINTAINING ENTIRE VIDEO IMAGE IN COMPOSITION INTENDED BY USER, CONTROL METHOD FOR IMAGE PICKUP APPARATUS, AND STORAGE MEDIUM

BACKGROUND OF THE INVENTION

Field of the Invention

The present invention relates to an image pickup apparatus, a control method for the image pickup apparatus, and a storage medium, and more particularly relates to an image pickup apparatus that assists a manual focus operation, a control method for the image pickup apparatus, and a storage medium.

Description of the Related Art

Conventionally, when producing a video image work, a photographing method has been known in which photographing is performed while focusing on a subject by a manual operation.

When performing this photographing method, a camera may be provided with a function that assists a manual focus operation so as to ensure that a subject desired by a user is in focus. For example, as this function, there is a technique in which a focus position where the subject desired by the user is in focus during test photographing is registered in the camera, and the camera notifies the user when the current focus position becomes the registered focus position during actual photographing.

In Japanese Laid-Open Patent Publication (kokai) No. 2004-287180, furthermore, when a difference between the focus position registered during the test photographing and the focus position during the actual photographing becomes less than or equal to a certain threshold value, the camera notifies the user in advance (the camera performs (gives) an advance notification to the user).

However, in Japanese Laid-Open Patent Publication (kokai) No. 2004-287180, when performing the actual photographing, a memory plate, on which a location (mark) of the focus position registered during the test photographing is marked, is displayed on a viewfinder or the like, and the above-mentioned advance notification is performed by switching the mark on the memory plate from a lit display to a blinking display. Therefore, the user cannot confirm whether or not the advance notification has been given unless he or she looks at the memory plate during the actual photographing. That is, in Japanese Laid-Open Patent Publication (kokai) No. 2004-287180, when the user is watching the entire video image displayed on the viewfinder or the like during the actual photographing, there is a possibility that the current focus position will pass through the registered focus position without noticing the above-mentioned advance notification. On the other hand, when the user watches the memory plate during the actual photographing, there is an issue that the entire video image cannot be maintained in a composition intended by the user.

SUMMARY OF THE INVENTION

The present invention provides an image pickup apparatus capable of, when a manual focus operation is performed during photographing, performing photographing with a subject desired by a user in focus while maintaining an entire video image in a composition intended by the user, a control method for the image pickup apparatus, and a storage medium.

Accordingly, the present invention provides an image pickup apparatus that assists a manual focus operation during photographing of a video image by using an image pickup lens with a focus mechanism, the image pickup apparatus comprising a display unit configured to display the video image being photographed on a screen, a rendering unit configured to render information on a focus of the image pickup lens on the screen, a first obtaining unit configured to obtain a current focus position of the image pickup lens during the photographing, a second obtaining unit configured to obtain a moving direction of the current focus position, a registration unit configured to register a focus position of the image pickup lens, a first highlighting unit configured to, in a case that a first condition that a difference between the current focus position and the registered focus position is less than or equal to a first threshold value is satisfied, render first information as the information on the focus of the image pickup lens and perform a first highlighted display of the screen, and a second highlighting unit configured to, in a case that a second condition that the difference between the current focus position and the registered focus position is less than or equal to a second threshold value smaller than the first threshold value is satisfied, render second information as the information on the focus of the image pickup lens and perform a second highlighted display of the screen. The first highlighting unit performs the first highlighted display of the screen based on the moving direction of the current focus position obtained by the second obtaining unit and the focus position registered by the registration unit.

According to the present invention, it is possible for the user to perform the photographing with the subject desired by the user in focus without taking his or her eyes off the entire video image displayed during the photographing.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Hereinafter, a preferred embodiment of the present invention will be described with reference to the drawings. In the present embodiment, an example, in which an image pickup apparatus according to the present invention is a video camera 100, will be described.

Figure 1:
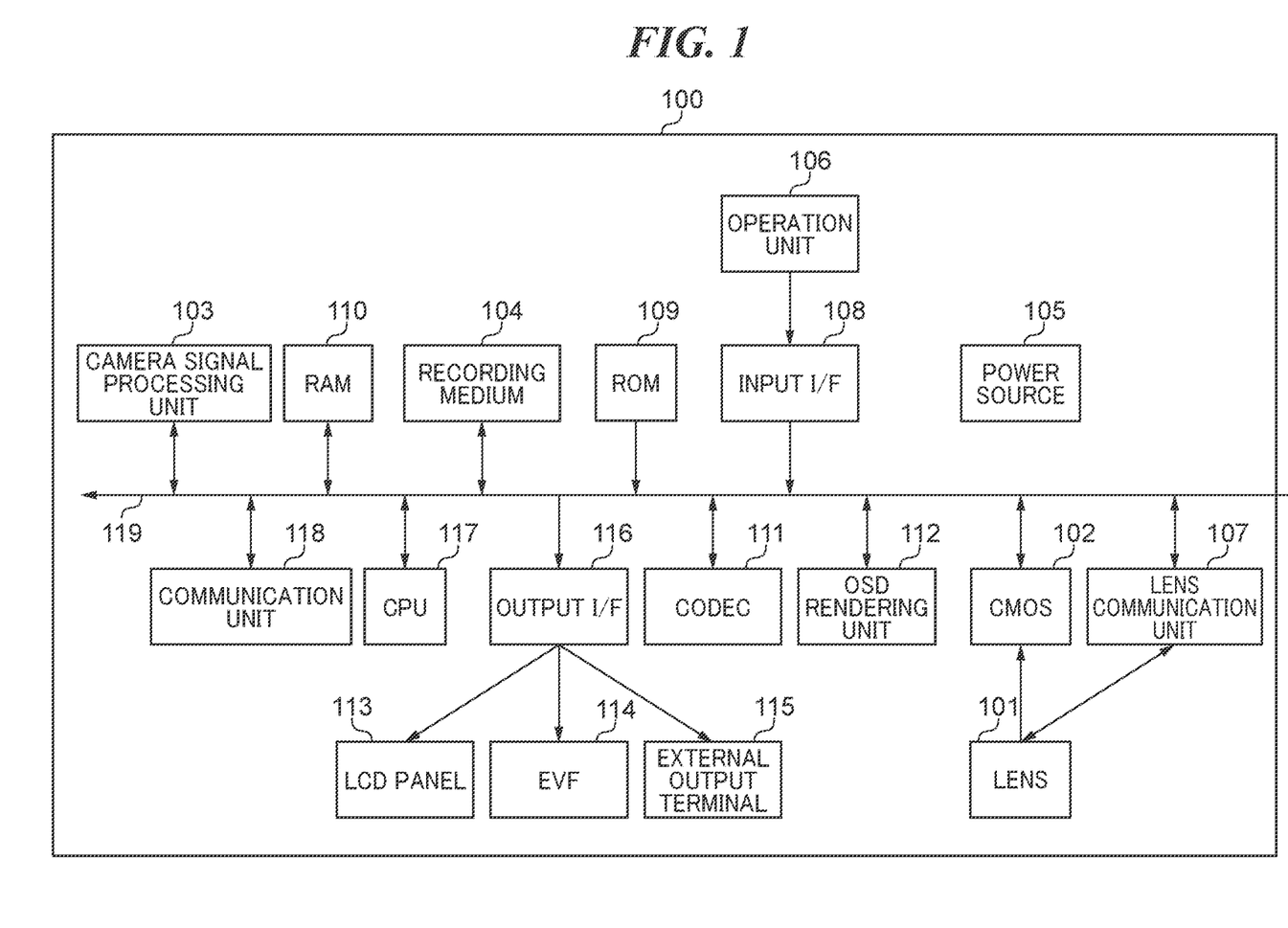
FIG. 1 is a block diagram that shows a hardware configuration of a video camera as an image pickup apparatus according to an embodiment of the present invention.

FIG. 1 is a block diagram that shows a hardware configuration of the video camera 100.

The video camera 100 includes a lens 101, a CMOS 102, a camera signal processing unit 103, a recording medium 104, a power source 105, an operation unit 106, a lens communication unit 107, an input interface (an input I/F) 108, a read only memory (a ROM) 109, a random access memory (a RAM) 110, and a compressor/decompressor (a CODEC) 111. Furthermore, the video camera 100 includes an on-screen display rendering unit (an OSD rendering unit) 112, an output I/F 116, a liquid crystal display panel (an LCD panel) 113, an electronic view finder (an EVF) 114, an external output terminal 115, a central processing unit (a CPU) 117, and a communication unit 118. Respective components are controlled by programs running on the CPU 117, and perform data input/output between them via a data bus 119.

The lens 101 (an image pickup lens) is an optical system having a focus mechanism, an aperture mechanism, etc., and forms an optical image of a subject. The CMOS 102 is a complementary metal-oxide-semiconductor (CMOS) solid-state image pickup device, includes an A/D converter (not shown), converts the optical image inputted from the lens 101 into analog electrical signals, and then converts them into digital signals. It should be noted that the image pickup device of the video camera 100 is not limited to the CMOS 102, and may be another image pickup device such as a charge coupled device (CCD) solid-state image pickup device. The digital signals outputted from the CMOS 102 are subjected to signal processing such as resizing processing such as predetermined pixel interpolation and reduction, color conversion, and various correction processing by the camera signal processing unit 103. Further, the digital signals subjected to the signal processing by the camera signal processing unit 103 are compressed and encoded at a predetermined bit rate and in a predetermined format by the CODEC 111, which will be described below, to become video image compression encoded data (hereinafter, simply referred to as "a video image"). The CODEC 111 also performs decoding of this video image. The recording medium 104 records the video image outputted from the CODEC 111 and metadata accompanying the video image.

The power source 105 is an AC power source or a battery, and supplies necessary power to the respective components of the video camera 100. The operation unit 106 includes a switch that performs ON/OFF control of the power source 105 of the video camera 100. In addition, the operation unit 106 includes a menu display button and a cross key, or includes a pointing device such as a touch panel. Operation information accepted by the operation unit 106 is inputted into the CPU 117 via the input I/F 108 and the data bus 119. The lens communication unit 107 communicates with the lens 101 regarding attachment information of the lens 101 to the video camera 100 and information such as a focus position and an angle of view. The ROM 109 stores a program for controlling the video camera 100, and the CPU 117 controls the respective components based on this program. The RAM 110 is a memory that functions as a work area for the CPU 117, and stores information on a focus position guide function, which will be described below, and focus positions registered in advance in test photographing. The CODEC 111 reproduces the video image and audio that are recorded in the RAM 110 and the recording medium 104. The reproduced video image is displayed on at least one output destination (display unit) of the LCD panel 113, the EVF 114, and a monitor (not shown) connected to the external output terminal 115. The OSD rendering unit 112 (a rendering unit) renders an on-screen display (an OSD) such as character strings and icons that represent the status and settings of the video camera 100, information on the focus of the lens 101 such as various kinds of frames and markers, and menus for various kinds of settings to a video random access memory (a VRAM) on the RAM 110. Resource data such as characters and icons that constitute the OSD is stored in the ROM 109, and when the CPU 117 generates the OSD by using the resource data, the OSD rendering unit 112 renders the OSD to the VRAM.

The output I/F 116 generates display signals based on the video image generated by the processing of the CMOS 102 and the camera signal processing unit 103 and display data such as the OSD generated by the CPU 117. In order to display the display signals on the LCD panel 113, the EVF 114, and the external output terminal 115, the output I/F 116 outputs the display signals to the LCD panel 113, the EVF 114, and the external output terminal 115. The external output terminal 115 is a terminal that satisfies serial digital interface (SDI) standard or high-definition multimedia interface (HDMI) standard (registered trademark) and outputs the video image generated by the processing of the CMOS 102 and the camera signal processing unit 103 to an external device. The output I/F 116 includes a mixer circuit (not shown) and outputs the video image and the OSD in a superimposed manner. Furthermore, it is possible to output signals resized according to each output. It is also possible to display the OSD with the same content in each output, or it is also possible to display different contents in each output by using a method described below. The CPU 117 executes the program loaded from the ROM 109 to the RAM 110. The communication unit 118 transmits and receives video image signals, audio signals, and other various kinds of information to and from external devices connected via wireless or wired cables.

Figure 2A:
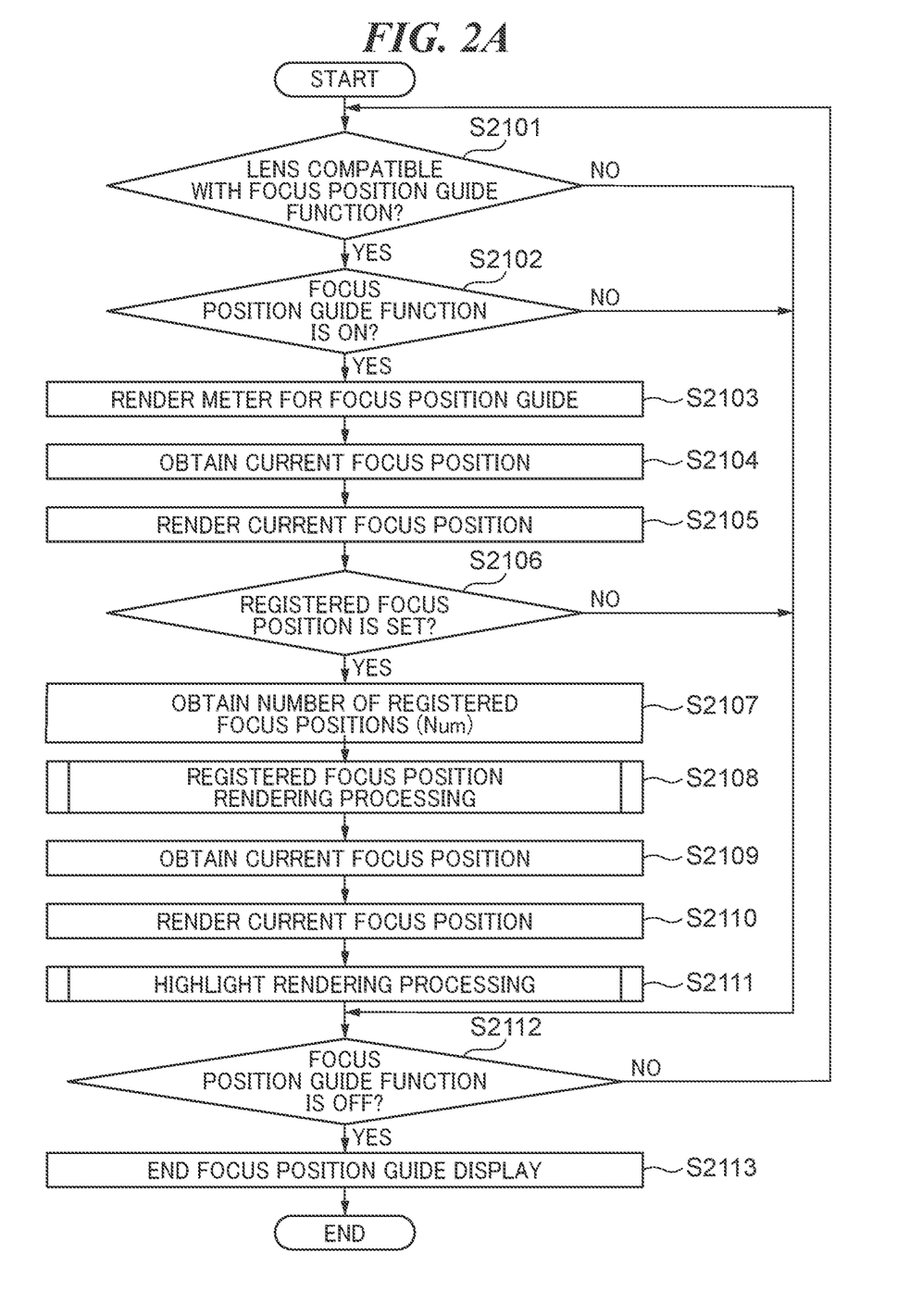
FIG. 2A is a flowchart that shows an example of a focus position guide processing executed in the video camera.

FIG. 2A is a flowchart that shows an example of a focus position guide processing executed in the video camera 100. The focus position guide processing is realized by the CPU 117 operating based on a program stored in the ROM 109 or the recording medium 104, or a program obtained via the communication unit 118, and controlling the respective components of the video camera 100. In addition, the focus position guide processing starts during actual photographing in which the video image being photographed is displayed on the at least one output destination in the video camera 100. Hereinafter, the focus position guide processing shown in the flowchart of FIG. 2A will be described by using screen examples of the video camera 100 shown in FIGS. 3A, 3B, 3C, 3D, 3E, and 3F.

First, in a step S2101, the CPU 117 determines whether or not a lens compatible with the focus position guide function (hereinafter, simply referred to as "a compatible lens") has been attached based on information obtained from the lens communication unit 107. In the case that the compatible lens has been attached (YES in the step S2101), the focus position guide processing proceeds to a step S2102. On the other hand, in the case that the compatible lens has not been attached (NO in the step S2101), the focus position guide processing proceeds to a step S2112. It should be noted that the focus position guide function is a function that guides a user to the focus position in order to assist a manual focus operation during photographing of the video image in the actual photographing.

In the step S2102, the CPU 117 determines whether or not the focus position guide function is turned on (the focus position guide function is ON) based on the information on the focus position guide function stored in the RAM 110. In the case that the focus position guide function is turned on (YES in the step S2102), the focus position guide processing proceeds to a step S2103. On the other hand, in the case that the focus position guide function is not turned on (NO in the step S2102), the focus position guide processing proceeds to the step S2112.

In the step S2103, the CPU 117 renders a meter 301 for the focus position guide by using the OSD rendering unit 112.

In a step S2104, the CPU 117 (a first obtaining unit) obtains information on the current focus position by the manual focus operation from the lens communication unit 107. In a step S2105, the CPU 117 renders the current focus position by using the OSD rendering unit 112 based on the information on the current focus position obtained in the step S2104. Specifically, the current focus position is rendered as a region for issuing an in-focus notification (an in-focus notification region 302 shown in FIG. 3A) with a width corresponding to a second threshold value in a far direction and a near direction of the current focus position. In addition, at this time, a region for issuing an advance notification (an advance notification region 303 shown in FIG. 3A) is also rendered with a width corresponding to a first threshold value (>the second threshold value) in the far direction and the near direction of the current focus position.

Thereafter, the CPU 117 outputs the OSD rendered in the steps S2103 and S2104 to the at least one output destination via the output I/F 116, and displays the OSD rendered in the steps S2103 and S2104.

Figure 3A:
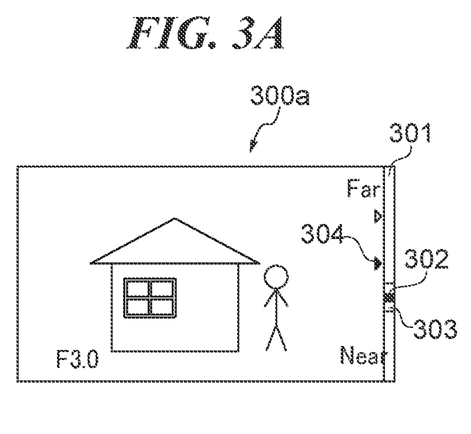
FIGS. 3A, 3B, 3C, 3D, 3E, and 3F are diagrams that show screen examples of the video camera.

FIG. 3A is a diagram that shows a screen 300*a* displayed on the video camera 100 when a highlighted display (highlighting), which will be described below, is not performed.

In FIG. 3A, on the screen 300*a*, in addition to the above-described in-focus notification region 302 and the above-described advance notification region 303, the meter 301 and a marker 304 are displayed so as to be superimposed on the video image during the actual photographing (are superimposed and displayed on the video image during the actual photographing).

The meter 301 is a meter for displaying the current focus position where the actual photographing is being performed. The marker 304 indicates a focus position when focusing on a subject desired by the user by means of the test photographing, and is registered as the focus position used in the focus position guide function by the CPU 117 (a registration unit) in response to a user operation in the test photographing. Information on the marker 304 is held in the RAM 110 as a part of focus registration information, which will be described below. In addition, in the case that there is a plurality of focus positions registered by means of the test photographing, the markers 304 corresponding to the respective focus positions are displayed in different colors, respectively, so as to be superimposed on the video image on the screen 300*a*.

In a step S2106, the CPU 117 determines whether or not the registered focus position has been set in advance in the test photographing. In the case that the registered focus position has been set in advance in the test photographing (YES in the step S2106), the focus position guide processing proceeds to a step S2107. On the other hand, in the case that the registered focus position has not been set in advance in the test photographing (NO in the step S2106), the focus position guide processing proceeds to the step S2112.

In the step S2107, the CPU 117 obtains the number of the registered focus positions. In a step S2108, the CPU 117 performs a registered focus position rendering processing, which will be described below with reference to FIG. 2B. In a step S2109, the CPU 117 obtains the information on the current focus position again from the lens communication unit 107. In a step S2110, the CPU 117 renders the OSD indicating the current focus position (specifically, the in-focus notification region 302 and the advance notification region 303) by using the OSD rendering unit 112 based on the information on the current focus position obtained in the step S2109. Thereafter, the CPU 117 outputs the OSD rendered to the at least one output destination via the output I/F 116, and displays the OSD rendered. As a result, for example, in the case that the in-focus notification region 302 does not match any one of the plurality of the registered focus positions, the screen shown in FIG. 3A is displayed on the at least one output destination.

In a step S2111, the CPU 117 performs a highlighted display rendering processing (a highlight rendering processing), which will be described below with reference to FIG. 2C. In the step S2112, the CPU 117 determines whether or not the focus position guide function is turned off (the focus position guide function is OFF) based on the information on the focus position guide function stored in the RAM 110. In the case that the focus position guide function is turned off (YES in the step S2112), the focus position guide processing proceeds to a step S2113. On the other hand, in the case that the focus position guide function is not turned off (NO in the step S2112), the focus position guide processing returns to the step S2101. In the step S2113, the CPU 117 ends displaying the focus position guide (ends the focus position guide display) and ends the focus position guide processing.

Figure 2B:
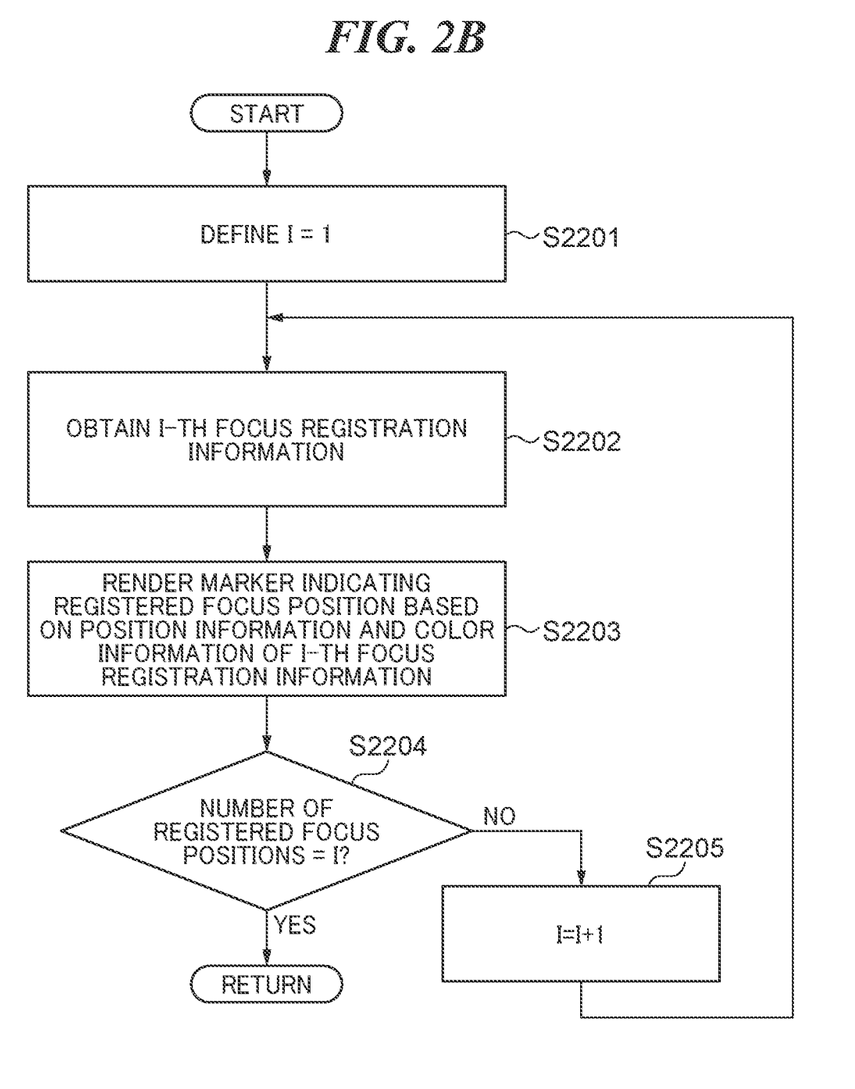
FIG. 2B is a flowchart that shows details of a registered focus position rendering processing performed in a step S2108 of FIG. 2A.

FIG. 2B is a flowchart that shows details of the registered focus position rendering processing performed in the step S2108 of FIG. 2A.

First, in a step S2201, the CPU 117 prepares a variable I and defines I=1. In a step S2202, the CPU 117 obtains the I-th focus registration information. Here, the focus registration information includes color information of the registered focus position, sensitivity information of the registered focus position, and position information of the registered focus position.

In a step S2203, the CPU 117 renders the marker 304 (see FIG. 3A) indicating the I-th registered focus position by using the OSD rendering unit 112. This rendering is executed based on the color information of the registered focus position and the position information of the registered focus position, which are included in the focus registration information obtained in the step S2202. In a step S2204, the CPU 117 compares the number of the registered focus positions obtained in the step S2107 with the variable I, and determines whether or not the number of the registered focus positions and the variable I match (the number of the registered focus positions is equal to the variable I). In the case that the number of the registered focus positions and the variable I do not match (NO in the step S2204), the registered focus position rendering processing proceeds to a step S2205. On the other hand, in the case that the number of the registered focus positions and the variable I match, the CPU 117 ends the registered focus position rendering processing. In the step S2205, the CPU 117 adds 1 to the variable I, and returns the registered focus position rendering processing to the step S2202.

Figure 2C:
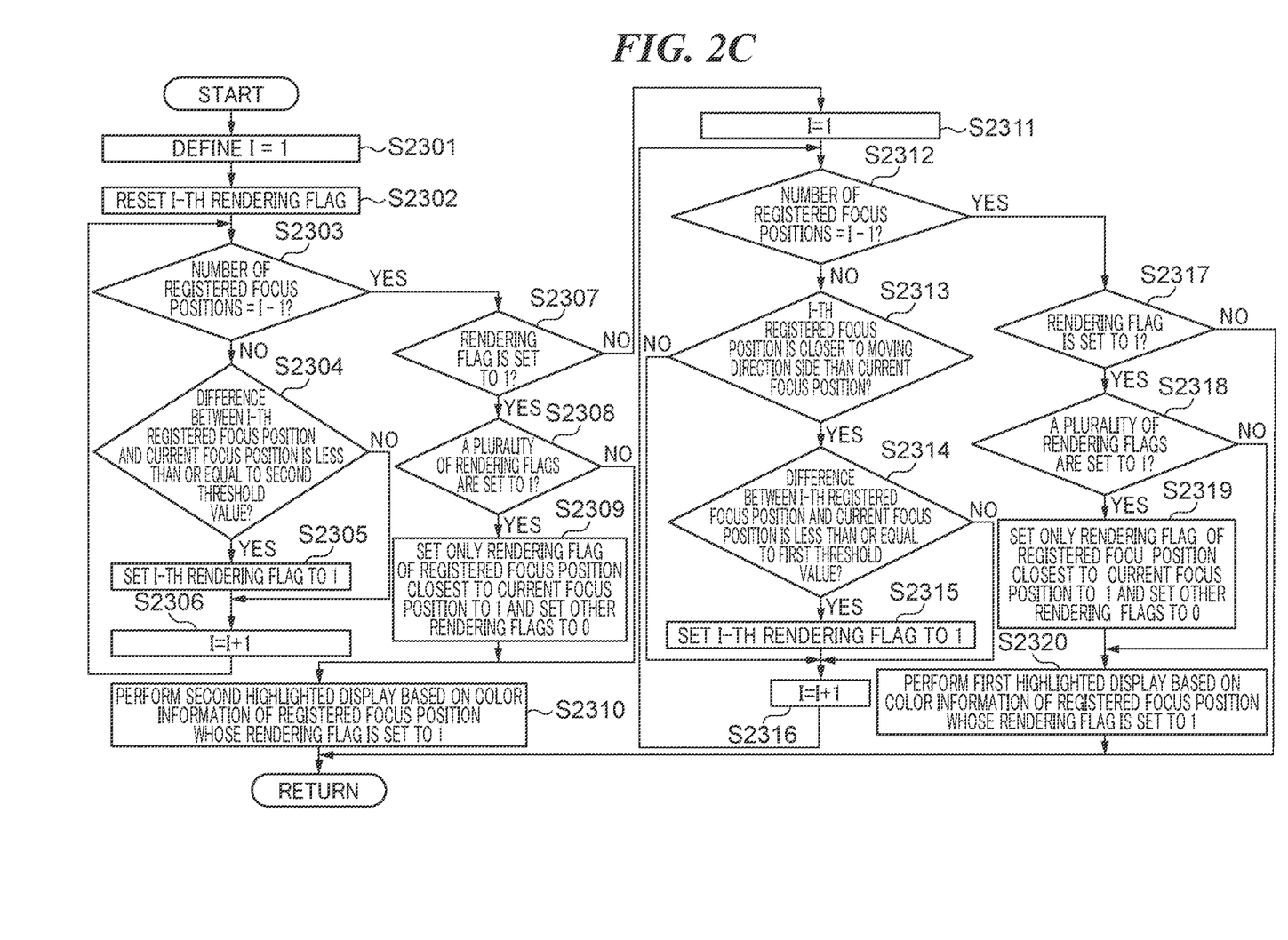
FIG. 2C is a flowchart that shows details of a highlighted display rendering processing performed in a step S2111 of FIG. 2A.

FIG. 2C is a flowchart that shows details of the highlighted display rendering processing performed in the step S2111 of FIG. 2A.

First, in a step S2301, the CPU 117 prepares a variable I and defines I=1. In a step S2302, the CPU 117 sets the I-th rendering flag to 0. In a step S2303, the CPU 117 determines whether or not I-1 matches the number of the registered focus positions obtained in the step S2107 (I-1 is equal to the number of the registered focus positions). In the case that I-1 matches the number of the registered focus positions (YES in the step S2303), the highlighted display rendering processing proceeds to a step S2307. On the other hand, in the case that I-1 does not match the number of the registered focus positions (NO in the step S2303), the highlighted display rendering processing proceeds to a step S2304.

In the step S2304, the CPU 117 determines whether or not a difference between the I-th registered focus position and the current focus position is less than or equal to the second threshold value. In the present embodiment, the second threshold value is determined based on sensitivity information of the I-th registered focus position obtained in the step S2202 of FIG. 2B. In the case that the difference between the I-th registered focus position and the current focus position is less than or equal to the second threshold value (a second condition is satisfied) (YES in the step S2304), the highlighted display rendering processing proceeds to a step S2305. On the other hand, in the case that the difference between the I-th registered focus position and the current focus position is greater than the second threshold value (the second condition is not satisfied) (NO in the step S2304), the highlighted display rendering processing proceeds to a step S2306. It should be noted that the second threshold value may be determined based on predetermined information other than the sensitivity information. For example, the second threshold value may be determined based on a rotatable angle of the lens 101, a focus movable distance, a depth of field, other user settings, etc.

In the step S2305, the CPU 117 sets the I-th rendering flag (sets the I-th rendering flag to 1). In the step S2306, the CPU 117 adds 1 to the variable I, and returns the highlighted display rendering processing to the step S2303. As a result, the rendering flags whose number is one more than the number of the registered focus positions are set. It should be noted that the rendering flags are set in order from the focus position registered at the position with the shallowest depth of focus.

In the step S2307, the CPU 117 determines whether or not there is a rendering flag that is set (there is a rendering flag whose value is 1). In the case that there is a rendering flag that is set (YES in the step S2307), the highlighted display rendering processing proceeds to a step S2308. On the other hand, in the case that all the rendering flags are not set (all the rendering flags whose values are 0) (NO in the step S2307), the highlighted display rendering processing proceeds to a step S2312.

In the step S2308, the CPU 117 determines whether or not a plurality of rendering flags are set (values of the plurality of rendering flags are 1). In the case that the plurality of rendering flags are set (YES in the step S2308), the highlighted display rendering processing proceeds to a step S2309. On the other hand, in the case that only one rendering flag is set (NO in the step S2308), the highlighted display rendering processing proceeds to a step S2310.

In the step S2309, the CPU 117 sets only the rendering flag of the registered focus position closest to the current focus position to 1, and sets the other rendering flags (the rendering flags other than the rendering flag of the registered focus position closest to the current focus position) to 0. In the step S2310, the CPU 117 causes the OSD rendering unit 112 to render the OSD of a frame 306 (see FIG. 3C) with the same emphasis color as the marker 304 indicating the registered focus position where the value of the rendering flag is 1 (second information). That is, the CPU 117 (a second highlighting unit) performs a highlighted display that surrounds the edge of a screen 300c (see FIG. 3C) with the frame 306 (a second highlighted display). It should be noted that the CPU 117 obtains information on the color of the marker 304 from the color information obtained in the step S2202 of FIG. 2B. Thereafter, the CPU 117 outputs the OSD rendered to the at least one output destination via the output I/F 116, and displays the OSD rendered. At this time, difference information from the registered focus position may be displayed. In this way, in the case that the in-focus notification region 302 matches the registered focus position, in the video camera 100, the highlighted display of the screen 300c (see FIG. 3C) is performed. It should be noted that the highlighted display (the highlighting method) may be performed by using not only a frame but also a numerical value, a rectangle, or the like.

Figure 3B:
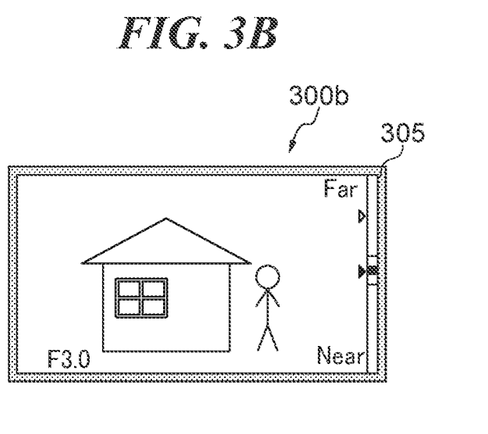
Figure 3C:
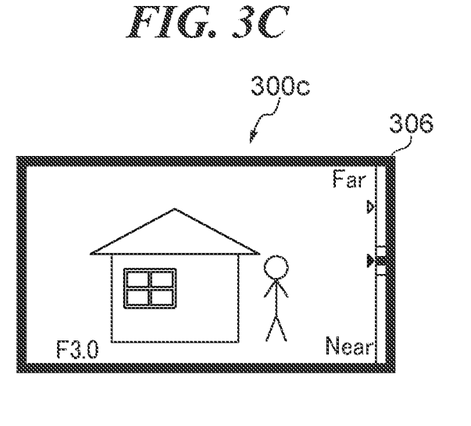
Figure 3D:
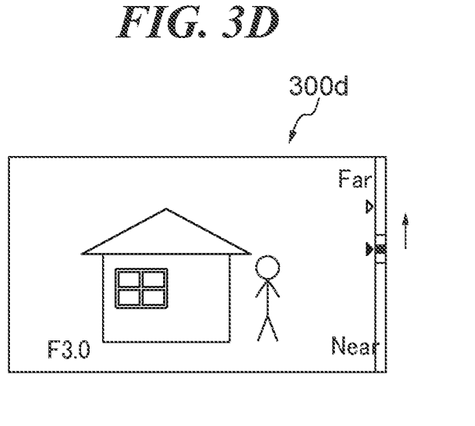

In a step S2311, the CPU 117 sets the variable I to 1. In the step S2312, the CPU 117 determines whether or not I-1 matches the number of the registered focus positions (I-1 is equal to the number of the registered focus positions). In the case that I-1 does not match the number of the registered focus positions (NO in the step S2312), the highlighted display rendering processing proceeds to a step S2313. On the other hand, in the case that I-1 matches the number of the registered focus positions (YES in the step S2312), the highlighted display rendering processing proceeds to a step S2317. In the step S2313, the CPU 117 (a second obtaining unit) obtains a moving direction of the current focus position (a focus moving direction) from the lens communication unit 107, and determines whether or not the I-th registered focus position is closer to the moving direction side than the current focus position obtained in the step S2104. In the case that the I-th registered focus position is closer to the moving direction side than the current focus position (YES in the step S2313), the highlighted display rendering processing proceeds to a step S2314. On the other hand, in the case that I-th registered focus position is not closer to the moving direction side than the current focus position (NO in the step S2313), the highlighted display rendering processing proceeds to a step S2316. By performing this determination, as shown in FIG. 3D, the frame 306 to be described below is not displayed when the current focus position passes through the registered focus position.

In the step S2314, the CPU 117 determines whether or not the difference between the I-th registered focus position and the current focus position is less than or equal to the first threshold value. In the present embodiment, the first threshold value is determined based on the sensitivity information of the I-th registered focus position obtained in the step S2202 of FIG. 2B. In the case that the difference between the I-th registered focus position and the current focus position is less than or equal to the first threshold value (a first condition is satisfied) (YES in the step S2314), the highlighted display rendering processing proceeds to a step S2315. On the other hand, in the case that the difference between the I-th registered focus position and the current focus position is greater than the first threshold value (the first condition is not satisfied) (NO in the step S2314), the highlighted display rendering processing proceeds to a step S2316. It should be noted that the first threshold value may be determined based on predetermined information other than the sensitivity information. For example, the first threshold value may be determined based on the rotatable angle of the lens 101, the focus movable distance, the depth of field, other user settings, etc.

In the step S2315, the CPU 117 sets the I-th rendering flag (sets the I-th rendering flag to 1). In the step S2316, the CPU 117 adds 1 to the variable I, and returns the highlighted display rendering processing to the step S2312.

In the step S2317, the CPU 117 determines whether or not there is a rendering flag that is set (there is a rendering flag whose value is 1). In the case that there is a rendering flag that is set (YES in the step S2317), the highlighted display rendering processing proceeds to a step S2318. On the other hand, in the case that all the rendering flags are not set (all the rendering flags whose values are 0) (NO in the step S2317), the CPU 117 ends the highlighted display rendering processing.

In the step S2318, the CPU 117 determines whether or not a plurality of rendering flags are set (values of the plurality of rendering flags are 1). In the case that the plurality of rendering flags are set (YES in the step S2318), the highlighted display rendering processing proceeds to a step S2319. On the other hand, in the case that only one rendering flag is set (NO in the step S2318), the highlighted display rendering processing proceeds to a step S2320.

In the step S2319, the CPU 117 sets only the rendering flag of the registered focus position closest to the current focus position to 1, and sets the other rendering flags (the rendering flags other than the rendering flag of the registered focus position closest to the current focus position) to 0. In the step S2320, the CPU 117 causes the OSD rendering unit 112 to render the OSD of a frame 305 (see FIG. 3B) with an emphasis color related to the color of the marker 304 indicating the registered focus position where the value of the rendering flag is 1 (first information). Here, in this case, the emphasis color related to the color of the marker 304 is a color obtained by lightening the color of the marker 304. That is, the CPU 117 (a first highlighting unit) performs an advance highlighted display that surrounds the edge of a screen 300b (see FIG. 3B) with the frame 305 (a first highlighted display). It should be noted that the CPU 117 obtains the information on the color of the marker 304 from the color information obtained in the step S2202 of FIG. 2B. Thereafter, the CPU 117 outputs the OSD rendered to the at least one output destination via the output I/F 116, and displays the OSD rendered. FIG. 3B is a diagram that shows the screen 300b that is pre-highlighted on the video camera 100 (the screen 300b where the advance highlighted display is performed on the video camera 100) when the advance notification region 303 matches the registered focus position. It should be noted that, in the present embodiment, although a color related to the registered focus position is used for the advance highlighted display, any color may be used as long as it is an advance display indicating that the current focus position is approaching the registered focus position. In addition, the advance highlighted display may be performed by using not only a frame but also a numerical value, a rectangle, or the like. In addition, the advance highlighted display may be performed in a different method capable of distinguishing between that the current focus position is approaching the registered focus position and that the current focus position has passed through the registered focus position based on the determination performed in the step S2104 (for example, in a method of changing the color of the frame 305).

According to the video camera 100 according to the present embodiment, in the case that the focus position guide function is ON during the actual photographing, when the current focus position approaches the registered focus position, as shown in the screen 300b in FIG. 3B, the advance highlighted display that surrounds the edge of the screen with the frame 305 is performed. In addition, when the current focus position matches the registered focus position (when the current focus position is in focus), as shown in the screen 300c in FIG. 3C, the highlighted display that surrounds the edge of the screen with the frame 306 is performed. Furthermore, by using different colors that are related to each other as the color of the frame 305 and the color of the frame 306, the user is notified that the notification contents are different. As a result, when the user performs the manual focus operation during the actual photographing, the user is able to confirm whether or not the subject desired by the user is in focus without taking his or her eyes off the entire video image on the screen of the EVF 114 or the like and watching a single point on the screen (the in-focus notification region 302 or the like). Therefore, when the manual focus operation is performed during the actual photographing, it is possible to perform photographing with the subject desired by the user in focus while maintaining the entire video image in a composition intended by the user.

It should be noted that since the second threshold value is a value smaller than the first threshold value as described above, in the case that the difference between the I-th registered focus position and the current focus position is less than or equal to the second threshold value, the difference between the I-th registered focus position and the current focus position is also less than or equal to the first threshold value. In this case, in the highlighted display rendering processing, by determining in the step S2304 whether or not the difference between the I-th registered focus position and the current focus position is less than or equal to the second threshold value before determining in the step S2314 whether or not the difference between the I-th registered focus position and the current focus position is less than or equal to the first threshold value, priority is given to the highlighted display shown in FIG. 3C over the advance highlighted display shown in FIG. 3B. As a result, it is possible to more reliably perform the photographing with the subject desired by the user in focus.

Figure 3E:
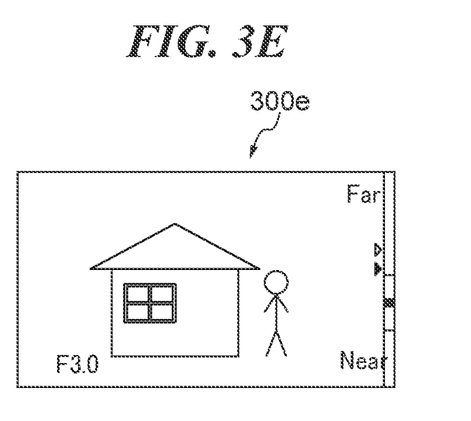
Figure 3F:
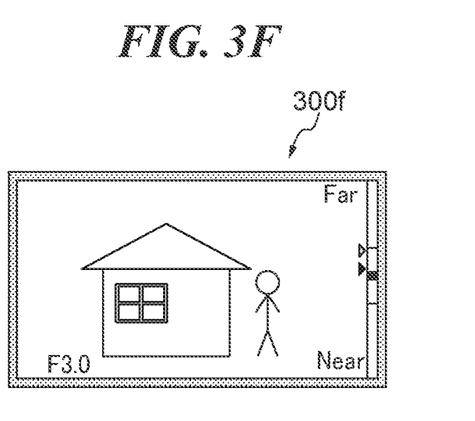

Furthermore, as shown in FIG. 3E, in the case that a plurality of adjacent registered focus positions are located close to each other, when the current focus position moves to the position shown in FIG. 3F, there may be a case where a plurality of registered focus positions exist within the advance notification region 303. In such a case, only the rendering flag of the registered focus position closest to the current focus position is set, and the frame 305 with a color related to the color of the marker 304 indicating the registered focus position is displayed. As a result, the user is able to intuitively recognize which registered focus position the current focus position is closest to while viewing the entire screen of the EVF 114 or the like.

Although the present invention has been described above in detail based on its preferred embodiments, the present invention is not limited to these specific embodiments, and the present invention also includes various forms without departing from the gist of the invention. Some of the embodiments described above may be combined as appropriate.

In addition, the present invention also includes a case where a software program that implements the functions of the above-described embodiments is supplied directly from a recording medium or using wired/wireless communication to a system or an apparatus having a computer capable of executing the program, and the program is executed.

Therefore, in order to realize the functional processing of the present invention on a computer, program codes itself that are supplied and installed in the computer also realizes the present invention. In other words, the present invention also includes a computer program itself for realizing the functional processing of the present invention.

In this case, the form of the program does not matter, such as object codes, a program executed by an interpreter, or script data supplied to an operating system (OS), as long as it has the functions of the program.

The recording medium for supplying the program may be, for example, a hard disk, a magnetic recording medium such as a magnetic tape, an optical/magnetic optical storage medium, or a nonvolatile semiconductor memory.

Further, as a method of supplying the program, a method may be considered in which a computer program forming the present invention is stored in a server on a network, and a connected client computer downloads the computer program from the server on the network.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-193493, filed on Dec. 2, 2022, which is hereby incorporated by reference herein in its entirety.

What is claimed is:

1. An image pickup apparatus that assists a manual focus operation during photographing of a video image by using an image pickup lens with a focus mechanism, the image pickup apparatus comprising:
a display unit configured to display the video image being photographed on a screen;
a rendering unit configured to render information on a focus of the image pickup lens on the screen;
a first obtaining unit configured to obtain a current focus position of the image pickup lens during the photographing;
a second obtaining unit configured to obtain a moving direction of the current focus position;
a registration unit configured to register a focus position of the image pickup lens;
a first highlighting unit configured to, in a case that a first condition that a difference between the current focus position and the registered focus position is less than or equal to a first threshold value is satisfied, render first information as the information on the focus of the image pickup lens and perform a first highlighted display of the screen; and
a second highlighting unit configured to, in a case that a second condition that the difference between the current focus position and the registered focus position is less than or equal to a second threshold value smaller than the first threshold value is satisfied, render second information as the information on the focus of the image pickup lens and perform a second highlighted display of the screen, and
wherein the first highlighting unit performs the first highlighted display of the screen based on the moving direction of the current focus position obtained by the second obtaining unit and the focus position registered by the registration unit.

2. The image pickup apparatus according to claim 1, wherein the first highlighting unit, in a case of determining that the current focus position has passed through the registered focus position based on the moving direction of the current focus position obtained by the second obtaining unit and the focus position registered by the registration unit, does not perform the first highlighted display.

3. The image pickup apparatus according to claim 1, wherein the first highlighting unit, in a case of determining that the current focus position is approaching the registered focus position and in a case of determining that the current focus position has passed through the registered focus position based on the moving direction of the current focus position obtained by the second obtaining unit and the focus position registered by the registration unit, makes a display method of the first highlighted display different.

4. The image pickup apparatus according to claim 1, wherein the first information and the second information are information including at least one of a numerical value and a rectangle.

5. The image pickup apparatus according to claim 1, wherein an emphasis color for performing the first highlighted display is a color related to an emphasis color for performing the second highlighted display.

6. The image pickup apparatus according to claim 1, wherein the first threshold value is determined based on at least one of a rotatable angle of the image pickup lens, a focus movable distance, a depth of field, and a user setting.

7. The image pickup apparatus according to claim 1, wherein the second threshold value is determined based on at least one of a rotatable angle of the image pickup lens, a focus movable distance, a depth of field, and a user setting.

8. The image pickup apparatus according to claim 1, wherein, in a case that both the first condition and the second condition are satisfied, the second highlighted display is given priority.

9. The image pickup apparatus according to claim 1, wherein the information on the focus of the image pickup lens includes information indicating the registered focus position.

10. The image pickup apparatus according to claim 1, wherein, in a case that there are a plurality of the registered focus positions, the plurality of the registered focus positions are superimposed and displayed on the video image in different colors, respectively.

11. The image pickup apparatus according to claim 10, wherein an emphasis color of the first highlighted display is the same color as a color in which the registered focus position, to which the current focus position is determined to be approaching among the plurality of the registered focus positions based on the moving direction of the current focus position obtained by the second obtaining unit and the focus position registered by the registration unit, is superimposed and displayed on the video image.

12. The image pickup apparatus according to claim 10, wherein an emphasis color of the second highlighted display is a color related to a color in which the registered focus position, to which the current focus position is determined to be approaching among the plurality of the registered focus positions based on the moving direction of the current focus position obtained by the second obtaining unit and the focus position registered by the registration unit, is superimposed and displayed on the video image.

13. The image pickup apparatus according to claim 10, wherein, in a case that the registered focus position closest to the current focus position among the plurality of the registered focus positions and the current focus position satisfy the first condition, an emphasis color of the first highlighted display is the same color as a color in which the registered focus position closest to the current focus position is superimposed and displayed on the video image.

14. The image pickup apparatus according to claim 10, wherein, in a case that the registered focus position closest to the current focus position among the plurality of the registered focus positions and the current focus position satisfy the second condition, an emphasis color of the second highlighted display is a color related to a color in which the registered focus position closest to the current focus position is superimposed and displayed on the video image.

15. A control method for an image pickup apparatus that assists a manual focus operation during photographing of a video image by using an image pickup lens with a focus mechanism,
the control method comprising:
a display step of displaying the video image being photographed on a screen;
a rendering step of rendering information on a focus of the image pickup lens on the screen;
a first obtaining step of obtaining a current focus position of the image pickup lens during the photographing;
a second obtaining step of obtaining a moving direction of the current focus position;
a registration step of registering a focus position of the image pickup lens;
a first highlighting step of, in a case that a first condition that a difference between the current focus position and the registered focus position is less than or equal to a first threshold value is satisfied, rendering first information as the information on the focus of the image pickup lens and performing a first highlighted display of the screen; and
a second highlighting step of, in a case that a second condition that the difference between the current focus position and the registered focus position is less than or equal to a second threshold value smaller than the first threshold value is satisfied, rendering second information as the information on the focus of the image pickup lens and performing a second highlighted display of the screen, and
wherein in the first highlighting step, the first highlighted display of the screen is performed based on the moving direction of the current focus position obtained in the second obtaining step and the focus position registered in the registration step.

16. A non-transitory computer-readable storage medium storing a program for causing a computer to execute a control method for an image pickup apparatus that assists a manual focus operation during photographing of a video image by using an image pickup lens with a focus mechanism,
the control method comprising:
a display step of displaying the video image being photographed on a screen;
a rendering step of rendering information on a focus of the image pickup lens on the screen;
a first obtaining step of obtaining a current focus position of the image pickup lens during the photographing;
a second obtaining step of obtaining a moving direction of the current focus position;
a registration step of registering a focus position of the image pickup lens;
a first highlighting step of, in a case that a first condition that a difference between the current focus position and the registered focus position is less than or equal to a first threshold value is satisfied, rendering first information as the information on the focus of the image pickup lens and performing a first highlighted display of the screen; and
a second highlighting step of, in a case that a second condition that the difference between the current focus position and the registered focus position is less than or equal to a second threshold value smaller than the first threshold value is satisfied, rendering second information as the information on the focus of the image pickup lens and performing a second highlighted display of the screen, and
wherein in the first highlighting step, the first highlighted display of the screen is performed based on the moving direction of the current focus position obtained in the second obtaining step and the focus position registered in the registration step.

* * * * *